Patented May 17, 1938

2,117,815

UNITED STATES PATENT OFFICE 2,117,815

METHOD OF RECOVERING PLASTICIZER FROM SCRAP CELLULOSE ESTER PRODUCTS

Gale F. Nadeau and Louis K. Eilers, Rochester, N. Y., assignors to Eastman Kodak Company, Rochester, N. Y., a corporation of New Jersey No Drawing. Application January 9, 1937, Serial No. 119,872

13 Claims. (Cl. 260—102)

The present invention relates to the removal and recovery of plasticizers from scrap colloidized cellulose ester material containing plasticizer, such as photographic film, by leaching the material with methyl alcohol, in which the cellulose ester is insoluble, and then extracting the plasticizer from the leaching liquid by means of a hydrocarbon, which is immiscible therewith.

Previously in the removing of plasticizer from scrap cellulose ester materials it has been difficult to obtain the plasticizer in pure condition without various expensive refining treatments. For instance if plasticizer is recovered from a leaching liquid by evaporation, it is contaminated with various other materials which have been extracted from film. Also, the cost of recovering the plasticizer is comparatively high.

One object of our invention is to provide a method of recovering plasticizer from scrap colloidized cellulose ester material particularly photographic film, either of the nitrate or the safety variety, in which the plasticizer is recovered in a fairly pure condition. Another object of our invention is to provide a method of recovering plasticizer at a considerably reduced cost over methods which have been employed heretofore. In our process the high cost of distilling all the leaching solvent is obviated. Other objects of our invention will appear herein.

We have found that, if photographic film, in which the base is either cellulose nitrate or an organic acid ester of cellulose, is extracted with methyl alcohol which is a non-solvent of the ester and which contains not more than an equal amount of water and this leaching liquor is then agitated with a hydrocarbon, providing the hydrocarbon is not miscible with the alcohol, the plasticizer which was present in the film is recovered from the leaching liquor in a substantially pure form. With nitrate film the leaching liquor should contain 50%–85% and preferably not more than 80% of methyl alcohol, the greater proportion of the remainder being water. With safety film, such as made from cellulose acetate or some other organic acid ester of cellulose, pure methyl alcohol may be employed for leaching without harmful softening of the film. However, it is preferred to employ methyl alcohol containing a small amount of water in view of the better results obtained with most extractants when a small amount of water is present therein. In our process a relatively small quantity of hydrocarbon will effectively remove a large quantity of plasticizer from its solution in the methyl alcohol with a countercurrent system removing practically all of the plasticizer, thus materially lowering the cost of separating the plasticizer from the extractant. After the removal of the plasticizer the methyl alcohol can again be employed as a leaching liquor.

For the extracting liquor a hydrocarbon which it not miscible with the methyl alcohol may be employed, it being preferred that the extractant be one which allows of inexpensive separation of the plasticizer therefrom. As a rule the use of a hydrocarbon having a boiling point below that of the plasticizer, is preferred although with some hydrocarbons, such as mineral oils, the plasticizer therein, especially in the case of camphor, may be removed by steaming. Some of the extractants which may be employed are benzol, toluene, cyclohexane, liquid paraffins, such as naphtha, gasoline, Stoddard solvent, ligroin, kerosene or mineral oils, ethylene chloride, carbontetrachloride, tetrahydronaphthalene and decahydronaphthalene.

As a rule the water content of the methyl alcohol increases the incompatibility of the extractant therewith which incompatibility is very desirable in obtaining a sharp separation in the extraction step. This is particularly true in the case of the chlorinated hydrocarbons some of which exhibit compatibility for methyl alcohol.

In the recovery of plasticizer from safety film scrap the leaching may be performed using methyl alcohol which is anhydrous or contains only a small percentage of water and after the leaching, water may be added to the methyl alcohol, prior to the extraction, thus decreasing the compatibility of the extractant and the methyl alcohol. This procedure has the disadvantage that the methyl alcohol from which the plasticizer has been removed is more aqueous than that employed initially. If this disadvantage is not serious such as where the water may be efficiently removed from the methyl alcohol, the above procedure may be used for recovering the plasticizer from safety film scrap. As the advantage of such a procedure lies in the increased speed with which the leaching may be performed and as the extraction is sharper when the methyl alcohol contains water, it is preferred that methyl alcohol containing water such as on the order of 20% be used in recovering plasticizer from scrap safety film.

In practice it is preferred to comminute the film scrap before treating with the methyl alcohol, such as by cutting into very small flakes or pieces. In the case of the comminution of nitrate film, it is advisable to keep the film moistened to reduce the fire hazard. After the emulsion has been removed from the film, for instance by means of hot water, the film is comminuted and then treated with a methyl alcohol-water mixture, the strength of the methyl alcohol being restricted in the case of nitrate film to 50-70%. After the plasticizer has been leached from the comminuted film scrap the methyl alcohol-water is separated from the scrap and extracted preferably counter-currently with a hydrocarbon of the characteristics referred to. By this means most of the plasticizer is taken up by the hydrocarbon extractant from which it can be easily removed by evaporating off the solvent. In some cases other materials will be leached from the film, this material remaining dissolved in the methyl alcohol layer in most cases so that the extraction separates the plasticizer from these other materials which may be present.

In the case of nitrate film scrap, the cost of recovery of the plasticizer and the nitrate was so expensive up to the time of our invention that film recovery offered very little advantage as far as cost is concerned over the cost of making the film from fresh nitrated cotton. We have found, however, that by our invention the cost of recovering the plasticizer from the film scrap may be radically reduced so as to be about 9% of the cost necessary with known methods. Also, with our invention there is no necessity of distilling the leaching solvent after the extraction before it can be reused. Therefore one is not obliged for economic reasons to use a low ratio of leaching solvent to scrap in leaching the plasticizer therefrom. Obviously this aids in more complete recovery of the plasticizer from the scrap material. The following examples illustrate the removal of plasticizer from nitrate film.

*Example I*

Nitrate film scrap, after removal of the emulsion therefrom containing camphor as the plasticizer therein was comminuted and one part of the scrap was leached with 2½ parts of a methyl alcohol-water mixture containing 60% of methyl alcohol. The leaching liquid was then counter-currently extracted with a mineral oil, boiling considerably above camphor. The hydrocarbon extractant may be a solid, in which case it is preferred that the extraction be carried out at a higher temperature so that the extractant will be liquefied or, at least, softened. After the camphor is removed from the extractant, either by sublimation or steam distillation, the extractant can be used to remove camphor from a second batch of film scrap.

The counter-current extraction is carried out in the same manner as any ordinary counter-current process, the leaching solvent containing the most camphor being treated with the extractant which has been employed previously on leaching solvents from which part of the camphor has been removed.

*Example II*

The procedure of the above example was repeated except that a hydrocarbon having a lower boiling point than camphor, such as a benzol, was used. The leaching solvent after being used to remove camphor from nitrate film scrap was counter-currently extracted with benzol by which extraction a concentrated solution of the camphor in the benzol was formed. By distilling off the extractant substantially pure camphor was recovered. The amount of heat necessary to remove the extracting liquid from the camphor was approximately 9% of that which would have been necessary if the camphor would have recovered directly from the methyl alcohol leaching liquor by distilling off the methyl alcohol and water therefrom. In the extraction of the camphor 4 parts of the leaching solvent which contained approximately 2½% camphor was counter-currently treated with 2 parts of the benzene. The camphor content of successive portions of the methyl alcohol-water mixture was determined. The extent to which the camphor was removed varied as follows: 100%, 96%, 88.5% and 82.4%. Thus it may be seen that with a relatively small quantity of benzene, using the counter-current set-up, the camphor can be substantially completely removed from the leaching solvent. In a case where 4 parts of the methyl alcohol-water mixture, containing 2½% camphor, was shaken with one part of benzene, 91% of the camphor was removed.

*Example III*

A similar procedure was followed as with Example II, except that one part of cyclohexane was used as an extractant of 4 parts of the methyl alcohol-water mixture containing 2½% camphor. The extraction was not counter-current. 84.5% of the camphor was removed from the leaching solvent. Repeating the same treatment with toluene as the extractant and with a single treatment 85% of the camphor was removed. With mineral oil instead of cyclohexane in the same set-up, 38.5% of the camphor was removed by one treatment.

The value of mineral oil as an extractant lies in the fact that the plasticizer particularly camphor can be recovered from the mineral oil by steam distillation so that high purity can be attained. As mineral oil is not as effective an extractant as the lower boiling hydrocarbons, it would be preferable to employ it only in the counter-current type of extraction with a sufficient series of extractions to effectively remove the camphor from the leaching liquor.

In the leaching of scrap film the film base should be swelled without being softened by the leaching liquid. In other words the swelling should be such that will not be apparent to the naked eye but that such an effect occurs will be evidenced by measurements. With nitrate film it is necessary that the methyl alcohol extractant contain water, which may be even up to as much as an equal amount, so that softening of the nitrate will not occur. With safety film scrap as a rule the less water present in the methyl alcohol, the quicker will be the removal of plasticizer from the scrap. However in the subsequent extraction a sharper separation occurs if the methyl alcohol contains some water. This water may come from the film scrap or it may be added to the leaching liquid after the leaching has occurred.

*Example IV*

Eight parts of comminuted cellulose acetate film scrap commonly referred to as "safety" film scrap in which triphenyl phosphate was employed as the plasticizer and from which the emulsion had been removed was leached with 100 parts of technical methyl alcohol, containing about 20% of water. The leaching liquid was removed from the scrap and counter-currently extracted with benzene removing substantially all the triphenyl phosphate from the methyl alcohol. The methyl alcohol may then be employed for another leaching. The triphenyl phosphate was recovered by distilling off the benzene therefrom.

Example V

Solutions of triphenyl phosphate in methyl alcohol of about 1% concentration, obtained by leaching film scrap, were shaken with ethylene dichloride, as indicated below, for a short time to enable the ethylene dichloride to withdraw the plasticizer from the leaching liquid. The ethylene chloride and methyl alcohol separated into layers and 50 cc. samples were withdrawn from each and analyzed for triphenyl phosphate content. The following data were obtained:

| Ratio of methyl alcohol to water | Volume of ethylene dichloride | Volume of aqueous methanol | Gms./50 cc. in ethylene dichloride layer | Gms./50 cc. in alcohol layer |
|---|---|---|---|---|
| 70:30 | 100 | 100 | 0.511 | 0.017 |
|  | 100 | 200 | 1.232 | 0.038 |
|  | 100 | 400 | 1.890 | 0.134 |
| 60:40 | 100 | 100 | 0.450 | 0.003 |
|  | 100 | 200 | 0.962 | 0.003 |
|  | 100 | 400 | 2.259 | 0.008 |

Example VI

Solutions of triphenyl phosphate in methyl alcohol of about 1% concentration obtained by leaching film scrap was extracted with toluene. The following results were obtained:

| Ratio of methyl alcohol to water | Volume of toluene | Volume of aqueous methanol | Gms./50 cc. in toluene layer | Gms./50 cc. in alcohol layer |
|---|---|---|---|---|
| 70:30 | 100 | 100 | 0.510 | 0.017 |
| 60:40 | 100 | 200 | 0.904 | 0.005 |

In either case the triphenyl phosphate can be separated in pure condition from the extractant by evaporating off the extractant.

Film containing other plasticizers than triphenyl phosphate or mixtures of plasticizers can also be treated by our invention and the plasticizer recovered therefrom. Plasticizers which are readily susceptible to recovery by this method are other phosphates such as tricresyl or tributyl, the phthalates such as tributyl phthalate, orthocresyl para-toluene sulphonate or the like. The base of the safety film from which the plasticizer is leached may be either cellulose acetate or one of the higher esters of cellulose such as cellulose acetate propionate or cellulose acetate butyrate. In any case the alteration of the process to be most suitable for each particular case would be very slight.

In the leaching of the film scrap it is unnecessary that the scrap be dry and with nitrate scrap it is even desirable to maintain wetness in the scrap to avoid fire and explosion hazards. Therefore in the leaching the methyl alcohol will pick up water. After the plasticizer has been extracted from the methyl alcohol, the water content of the latter may be more than desired. Methyl alcohol of high concentration may be added to the spent leaching liquid, preferably after extraction, to bring that liquid up to the desired strength for the leaching of further scrap film.

If in time the amount of methyl alcohol leaching liquid becomes too large due to the continued addition of further methyl alcohol to maintain the desired concentration, some of the liquid may be separated from the bulk of the liquid and distilled to separate water therefrom. When this water-poor portion is returned the concentration of the methyl alcohol is obviously increased. If desired instead of adding concentrated methyl alcohol a portion of the liquid may be distilled and then returned to the whole to concentrate the leaching liquid. This merely amounts to adding concentrated methyl alcohol except that the amount of the leaching liquid is not increased. There is, however, no loss involved in using a large amount of leaching liquid as it may substantially all be recovered and reused by our invention. As the use of a relatively large amount of leaching liquid aids in the leaching of the scrap and there is no more loss with a large amount than with a small amount it is preferred that a large amount be used.

Our extraction process may be readily carried out at any temperature approximating room temperature. It is preferred, however, that the temperature be lower than 70° F. as this lower temperature increases the sharpness of the separation of the extractant and the leaching liquor in the extraction portion of our process. Conversely, too high a temperature might increase the solubility of the hydrocarbon in the leaching solvent and thereby reduce the effectiveness of the separation.

Our invention is not limited to the recovery of plasticizer from scrap photographic film but may be employed in the extraction of plasticizer from colloidized cellulose ester materials containing it. For instance sheeting, artificial yarn, overcoatings, celluloid articles or any other like products particularly if the cellulose ester is in the form of a layer may be treated to recover plasticizer therefrom in accordance with our invention.

We claim:—

1. In the recovery of the cellulose ester and the plasticizer from a scrap colloidized cellulose ester material containing plasticizer the steps which comprise leaching the scrap with a methyl alcohol leaching liquid containing not more than an equal quantity of water which is present in sufficient amount to prevent softening of the film base and then extracting the leaching liquid to remove the plasticizer therefrom with a non-gaseous fluid hydrocarbon immiscible with the leaching liquid.

2. In the recovery of the cellulose ester and the plasticizer from scrap photographic film the steps which comprise leaching the scrap with a methyl alcohol leaching liquid, containing not more than an equal quantity of water which is present in sufficient amount to prevent softening of the film base and then counter-currently extracting the leaching liquid to remove the plasticizer therefrom with a non-gaseous fluid hydrocarbon immiscible with the leaching liquid.

3. In the recovery of the organic acid ester of cellulose and the plasticizer from scrap photographic safety film the steps which comprise leaching the scrap with a methyl alcohol leaching liquid, containing an equal quantity of water which is present in sufficient amount to prevent softening of the film base and then extracting the leaching liquid to remove the plasticizer therefrom with a non-gaseous fluid hydrocarbon which is immiscible with the leaching liquid.

4. In the recovery of the organic acid ester of cellulose and the plasticizer from scrap photographic safety film the steps which comprise leaching the scrap with a methyl alcohol leaching liquid containing not more than an equal quantity of water which is present in sufficient amount to prevent softening of the film base and then counter-currently extracting the leaching liquid, to remove the plasticizer therefrom, with a non-gaseous fluid hydrocarbon which is immiscible with the leaching liquid.

5. In the recovery of the cellulose ester and the plasticizer from scrap photographic film having an organic phosphate-plasticized organic acid ester of cellulose base, the steps which comprise leaching the scrap with a methyl alcohol leaching liquid containing not more than an equal quantity of water which is present in sufficient amount to prevent softening of the film base and then extracting the leaching liquid, to remove the phosphate plasticizer therefrom, with a non-gaseous fluid hydrocarbon which is immiscible with the leaching liquid.

6. In the recovery of cellulose acetate and the plasticizer from a scrap photographic film having a plasticized cellulose acetate base, the steps which comprise leaching the scrap with a methyl alcohol leaching liquid containing not more than an equal quantity of water which is present in sufficient amount to prevent softening of the film and then extracting the leaching liquid, to remove the plasticizer, with a non-gaseous fluid hydrocarbon which is immiscible with the leaching liquid.

7. In the recovery of cellulose acetate and the plasticizer from a scrap photographic film having a plasticized cellulose acetate base, the steps which comprise leaching the scrap with a methyl alcohol leaching liquid containing not more than an equal quantity of water which is present in sufficient amount to prevent softening of the film and then extracting the leaching liquid to remove the plasticizer with benzene, which is immiscible with the leaching liquid.

8. In the recovery of cellulose acetate, and the plasticizer from a scrap photographic film having a plasticized cellulose acetate base the steps which comprise leaching the scrap with a methyl alcohol leaching liquid containing not more than an equal quantity of water which is present in sufficient amount to prevent softening of the film and then extracting the leaching liquid to remove the plasticizer with toluene, which is immiscible with the leaching liquid.

9. In the recovery of cellulose nitrate and the plasticizer from scrap film having a plasticized cellulose nitrate base, the steps which comprise leaching the scrap with methyl alcohol-water, the former being 50–70% of the mixture and then extracting the leaching liquid to remove the plasticizer therefrom with a non-gaseous fluid hydrocarbon which is immiscible with the leaching liquid.

10. In the recovery of cellulose nitrate and camphor from scrap photographic film having a camphor-plasticized cellulose nitrate base, the steps which comprise leaching the scrap with methyl alcohol-water, the former constituting 50–70% of the mixture and then extracting the camphor from the leaching liquid with a non-gaseous fluid hydrocarbon which is immiscible with the leaching liquid.

11. In the recovery of cellulose nitrate and camphor from scrap photographic film having a camphor-plasticized cellulose nitrate base, the steps which comprise leaching the scrap with methyl alcohol-water, the former constituting 50–70% of the mixture and then countercurrently extracting the camphor from the leaching liquid with a non-gaseous fluid hydrocarbon which is immiscible with the leaching liquid.

12. In the recovery of cellulose nitrate and camphor from scrap photographic film having a camphor-plasticized cellulose nitrate base, the steps which comprise leaching the scrap with methyl alcohol-water, the former constituting 50–70% of the mixture and then counter-currently extracting the camphor from the leaching liquid with a mineral oil.

13. A cyclic process for the recovery of plasticizer from scrap colloidized cellulose ester material containing plasticizer which comprises leaching a batch of the material with a methyl alcohol leaching liquid which will not soften the material, to remove the plasticizer therefrom, extracting the plasticizer from the leaching liquid with a non-gaseous fluid hydrocarbon which is immiscible therewith and then leaching a second batch of colloidized cellulose ester material to remove plasticizer therefrom with the extracted leaching liquid.

GALE F. NADEAU.
LOUIS K. EILERS.